US011461656B2

(12) United States Patent
Hirano

(10) Patent No.: US 11,461,656 B2
(45) Date of Patent: Oct. 4, 2022

(54) GENETIC PROGRAMMING FOR PARTIAL LAYERS OF A DEEP LEARNING MODEL

(71) Applicant: Rakuten Group, Inc., Tokyo (JP)

(72) Inventor: Hiromi Hirano, Tokyo (JP)

(73) Assignee: Rakuten Group Inc., Tokyo (JP)

( * ) Notice: Subject to any disclaimer, the term of this patent is extended or adjusted under 35 U.S.C. 154(b) by 905 days.

(21) Appl. No.: 16/325,321

(22) PCT Filed: Mar. 15, 2017

(86) PCT No.: PCT/JP2017/010474
§ 371 (c)(1),
(2) Date: Feb. 13, 2019

(87) PCT Pub. No.: WO2018/167885
PCT Pub. Date: Sep. 20, 2018

(65) Prior Publication Data
US 2019/0205763 A1 Jul. 4, 2019

(51) Int. Cl.
*G06N 3/04* (2006.01)
*G06N 3/08* (2006.01)
*G06N 3/12* (2006.01)

(52) U.S. Cl.
CPC .......... *G06N 3/086* (2013.01); *G06N 3/0472* (2013.01); *G06N 3/08* (2013.01); *G06N 3/12* (2013.01); *G06N 3/126* (2013.01)

(58) Field of Classification Search
CPC ........ G06N 3/04; G06N 3/0454; G06N 3/086; G06N 3/126
See application file for complete search history.

(56) References Cited

U.S. PATENT DOCUMENTS

| 6,327,582 B1* | 12/2001 | Worzel | G06F 8/30 706/13 |
| 2017/0154260 A1* | 6/2017 | Hamada | G06N 3/0454 |
| 2018/0114115 A1* | 4/2018 | Liang | G06N 3/04 |
| 2019/0370659 A1* | 12/2019 | Dean | G06N 3/082 |

OTHER PUBLICATIONS

Shelhamer, E., et al., "Fully Convolutional Networks for Semantic Segmentation", arXiv:1 605.06211v1 [cs.CV], 2016, pp. 1-12.
International Preliminary Report on Patentability dated Sep. 26, 2019, PCT/JP2017/010474.

* cited by examiner

*Primary Examiner* — Hal Schnee
(74) *Attorney, Agent, or Firm* — Sughrue Mion, PLLC

(57) ABSTRACT

An information processing device according to one embodiment includes a processor. The processor executes an acquisition step of acquiring a plurality of partial layers as a gene pool, the partial layers being candidates for elements of a deep learning model, a generation step of generating a new partial layer from the gene pool by using genetic programming, an evaluation step of evaluating each partial layer by incorporating, into a template of the deep learning model, each partial layer in the gene pool to which the new partial layer is added, and determining a plurality of partial layers to remain in the gene pool, and an output step of outputting the deep learning model into which the partial layer with a highest evaluation value is incorporated.

10 Claims, 11 Drawing Sheets

*Fig.1*

```
...
def main():
    X_train = []
    X_test = []
    Y_train = []
    Y_test = []

nb_classes = 10
    batch_size = 32
    nb_epoch = 10 with open("X_train.pkl", "rb") as f:
        X_train = pickle.load(f)
    f.close()

with open("X_test.pkl", "rb") as f:
        X_test = pickle.load(f)
    f.close()

with open("Y_train.pkl", "rb") as f:
        Y_train = pickle.load(f)
    f.close()

with open("Y_test.pkl", "rb") as f:
        Y_test = pickle.load(f)
    f.close()

with open("encFile.pkl", "rb") as f:
        inImage = pickle.load(f)
    f.close()

Execute generated snippet z = AveragePooling2D(pool_size=(2,2))(inImage)

fx = Flatten()(z)
    fx = Dense(512, activation="relu")(fx)
    fx = Dense(nb_classes, activation="softmax")(fx)

model = Model(input=inImage, output=fx)
    # ----- End of definition
    ...
```

210
211 — # Individual 0
Z0 = merge([inImage, inImage], mode="sum")
Z1 = MaxPooling2D()(inImage)
z = Z1

212 — # Individual 1
Z0 = merge([inImage, inImage], mode="sum")
Z1 = Convolution2D(3, 3, 3, border_mode="same")(Z0)
Z2 = MaxPooling2D()(Z1)
Z3 = Convolution2D(3, 3, 3, border_mode="same")(Z2)
z = AveragePooling2D(pool_size=(2,2))(Z3)

213 — # Individual 2
z = MaxPooling2D()(inImage)

...

GENETIC PROGRAMMING FOR PARTIAL LAYERS OF A DEEP LEARNING MODEL

CROSS REFERENCE TO RELATED APPLICATIONS

This application is a National Stage of International Application No. PCT/JP2017/010474, filed on Mar. 15, 2017, which is incorporated herein by reference.

TECHNICAL FIELD

One aspect of the present invention relates to an information processing device, an information processing method, and an information processing program related to deep learning.

BACKGROUND ART

The study of deep learning has been actively in progress recently, and each of researchers designs an optimum deep learning model according to their studies. For example, a fully convolutional network (FCN) is disclosed in the following Non Patent Literature 1. The FCN is a technique used in semantic segmentation that makes a prediction of an object from an image on a pixel-by-pixel basis.

CITATION LIST

Non Patent Literature

NPL1: Long, J., Shelhamer, E. and Darrell, T. "Fully Convolutional Networks for Semantic Segmentation," arXiv: 1605.06211v1 [cs.CV], May 20, 2016.

SUMMARY OF INVENTION

Technical Problem

The design of a deep learning model requires knowledge and experience of researchers, and it is difficult to find an appropriate model. For example, some researches cannot find an appropriate model or spend a lot of time to find such a model. It is therefore required to automatically construct an appropriate deep learning model.

Solution to Problem

An information processing device according to one aspect of the present invention is an information processing device including a processor, and the processor executes an acquisition step of acquiring a plurality of partial layers as a gene pool, the partial layers being candidates for elements of a deep learning model, a generation step of generating a new partial layer from the gene pool by using genetic programming, an evaluation step of evaluating each partial layer by incorporating, into a template of the deep learning model, each partial layer in the gene pool to which the new partial layer is added, and determining a plurality of partial layers to remain in the gene pool and an output step of outputting the deep learning model into which the partial layer with a highest evaluation value is incorporated.

An information processing method according to one aspect of the present invention is an information processing method performed by an information processing device including a processor, the method including an acquisition step of acquiring a plurality of partial layers as a gene pool, the partial layers being candidates for elements of a deep learning model, a generation step of generating a new partial layer from the gene pool by using genetic programming, an evaluation step of evaluating each partial layer by incorporating, into a template of the deep learning model, each partial layer in the gene pool to which the new partial layer is added, and determining a plurality of partial layers to remain in the gene pool and an output step of outputting the deep learning model into which the partial layer with a highest evaluation value is incorporated.

An information processing program according to one aspect of the present invention causes a computer to execute an acquisition step of acquiring a plurality of partial layers as a gene pool, the partial layers being candidates for elements of a deep learning model, a generation step of generating a new partial layer from the gene pool by using genetic programming, an evaluation step of evaluating each partial layer by incorporating, into a template of the deep learning model, each partial layer in the gene pool to which the new partial layer is added, and determining a plurality of partial layers to remain in the gene pool and an output step of outputting the deep learning model into which the partial layer with a highest evaluation value is incorporated.

In the above aspects, a gene pool is prepared that contains a plurality of partial layers (present-generation partial layers), which are candidates for elements of a deep learning model, and a new partial layer (next-generation partial layer) generated using genetic programming. Then, the gene pool is updated by evaluating each of the partial layers in those generations and determining partial layers to remain in the gene pool. By performing such a series of processing (search) using genetic programming, it is expected to obtain a partial layer that leads to good computational results. This partial layer is incorporated into a deep learning model, and it is thereby possible to construct the deep learning model that is expected to be most appropriate.

Advantageous Effects of Invention

According to one aspect of the present invention, it is possible to automatically construct an appropriate deep learning model.

BRIEF DESCRIPTION OF DRAWINGS

FIG. 1 is a view showing an example of a deep learning model.

FIG. 2 is a view showing an example of a gene pool.

DESCRIPTION OF EMBODIMENTS

Figure 3:
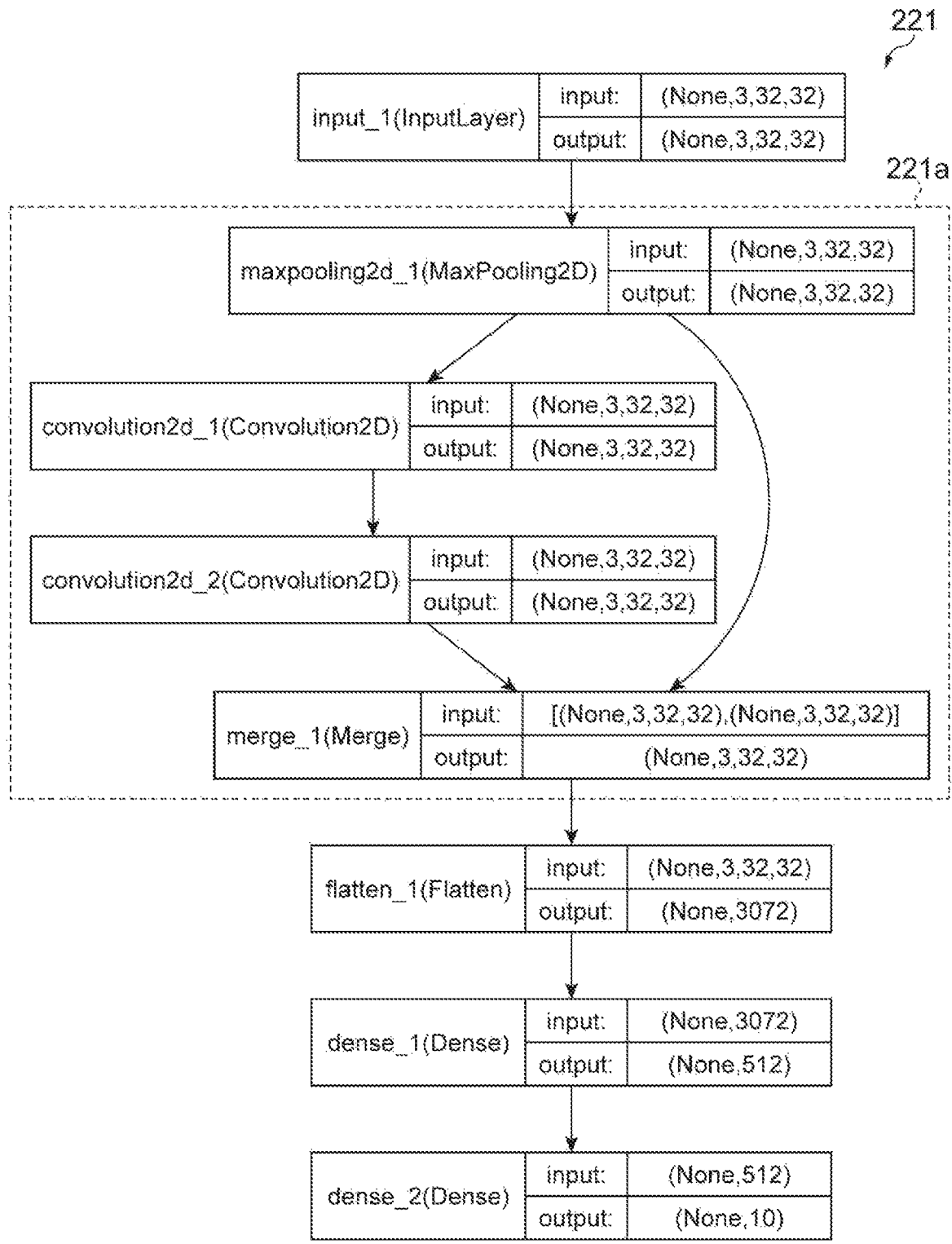
FIG. 3 is a view showing an example of a network structure of a deep learning model.

An embodiment of the present invention is described hereinafter in detail with reference to the appended drawings. Note that, in the description of the drawings, the same or equivalent elements are denoted by the same reference symbols, and the redundant explanation thereof is omitted.

Overview

An information processing device 10 according to an embodiment is a computer or a computer system that automatically constructs a deep learning model for finding the solution of a complicated problem. "Deep learning" is machine learning using a multi-layer neural network (deep neural network), and "deep learning model" is an expression representing the structure of the deep neural network (which is hereinafter referred to simply as "network structure"). To "automatically construct a deep learning model" means that the information processing device 10 generates at least some elements of a deep learning model without any manual intervention, and outputs a deep learning model containing the generated elements. The form of representation of the deep learning model generated by the information processing device 10 is not particularly limited. For example, the information processing device 10 may represent the deep learning model by an algorithm or program code or may represent it in an abstract way using a network diagram.

FIG. 1 shows a deep learning model 201 represented as a program. Note that FIG. 1 shows only part of the deep learning model 201. The deep learning model 201 is used to recognize an object from an image. The deep learning model 201 is merely an example, and an objective of a deep learning model to be constructed by the information processing device 10 and processing executed by the deep learning model are not restricted in any way.

A part of the deep learning model 201 which is enclosed by a block 202 is an algorithm that captures the characteristics of a problem to be solved, and it corresponds to a network structure, which is a key part of deep learning. There is no particular guiding principle to construct this key part, and researchers or developers have been created an algorithm (network structure) in the block 202 by trial and error. In this embodiment, the information processing device 10 automatically generates an algorithm as the key part. The information processing device 10 generates a deep learning model by automatically generating a key part and incorporating the key part into a predetermined part, rather than by automatically generating an entire deep learning model.

In this specification, the key part to be automatically generated by the information processing device 10 is referred to as "partial layer", and a predetermined part (a part different from a partial layer) of a deep learning model to be generated is referred to as "template". Further, a deep learning model that is obtained by incorporating the partial layer into the template is referred to as "individual". In the example of FIG. 1, the block 202 corresponds to the partial layer, a part other than the block 202 of the deep learning model 201 corresponds to the template, and the entire deep learning model 201 including the block 202 corresponds to the individual.

A procedure for the information processing device 10 to generate a deep learning model is generally as follows. First, the information processing device 10 generates a plurality of candidates for a network structure, which are partial layers, to be incorporated into the template. Each partial layer contains at least one non-terminal symbol. The non-terminal symbol is a substitutable symbol, and it corresponds to one function or one expression represented using a variable, for example. The partial layer also contains information indicating the processing sequence of non-terminal symbols (e.g., functions or expressions).

It is assumed in this embodiment that non-terminal symbols that constitute a partial layer are the following four types of functions provided by the deep learning framework called Keras.
(1) merge([x,y],mode="sum")→x+y
(2) Convolution2D(3,3,3,border_mode="same")x)→conv (x)
(3) MaxPooling2D( )(x)→y
(4) AveragePooling2D(pool_size=(2,2))(x)→y The merge function adds two signals x and y and outputs the result. The Convolution2D function receives an image x, executes convolution operation, and outputs the result. The MaxPooling2D function receives an image x and outputs pooling using a maximum value in a region. The AveragePooling2D function receives an image x and outputs pooling using an average value in a region.

Note that those non-terminal symbols are merely examples. Because processing executed by a deep learning model is not restricted in any way as described above, the type and specific structure of a non-terminal symbol are also not restricted.

In this specification, a set of a plurality of partial layers is referred to as "gene pool". FIG. 2 shows an example of a gene pool. In this example, a gene pool 210 contains partial layers 211, 212, 213 and so on. As described above, those partial layers are automatically generated by the information processing device 10. The number of partial layers in the gene pool is not particularly limited, and it may be 2, 3, 5, 10 or 30, for example.

Figure 4:
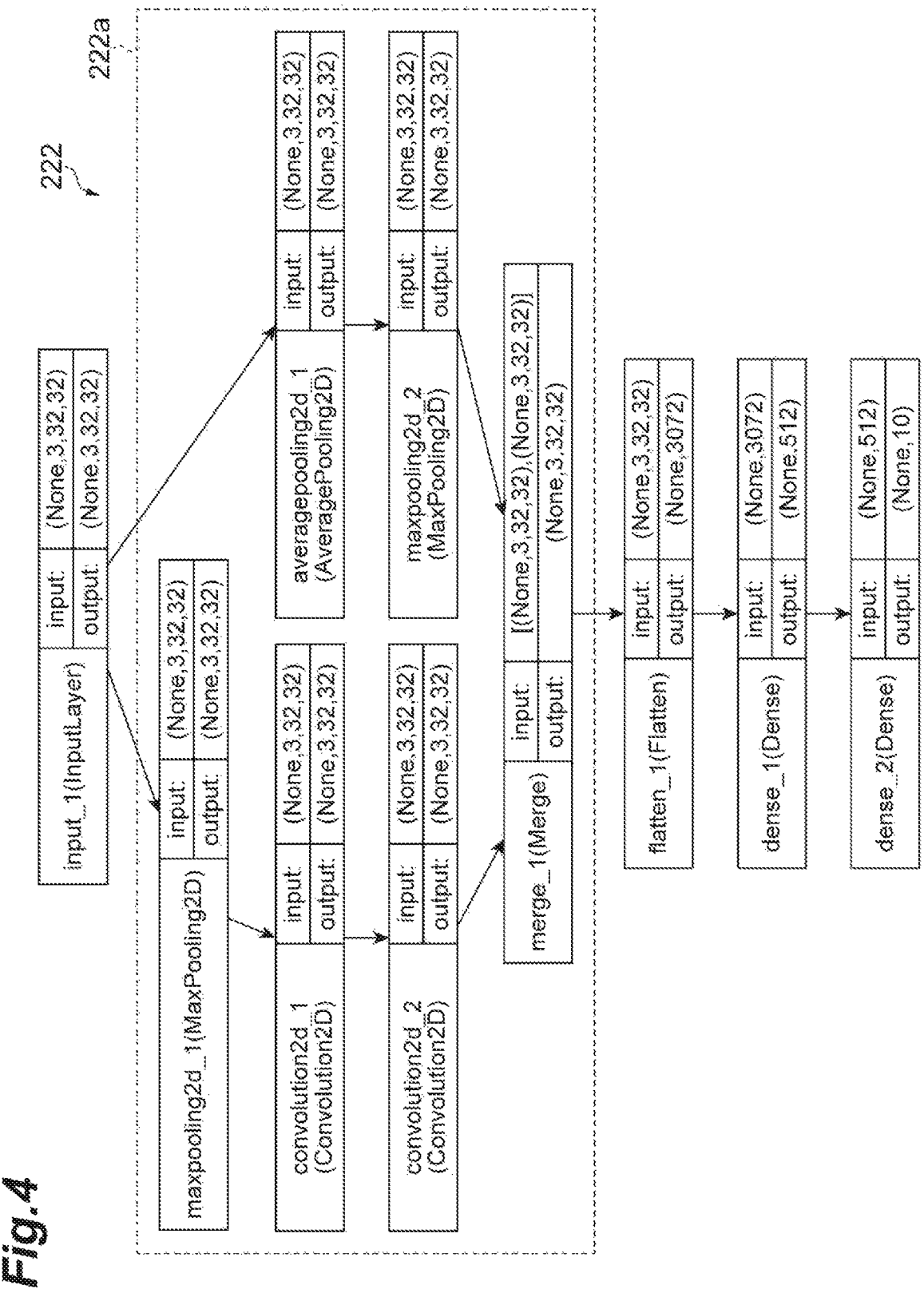
FIG. 4 is a view showing another example of a network structure of a deep learning model.
Figure 5:
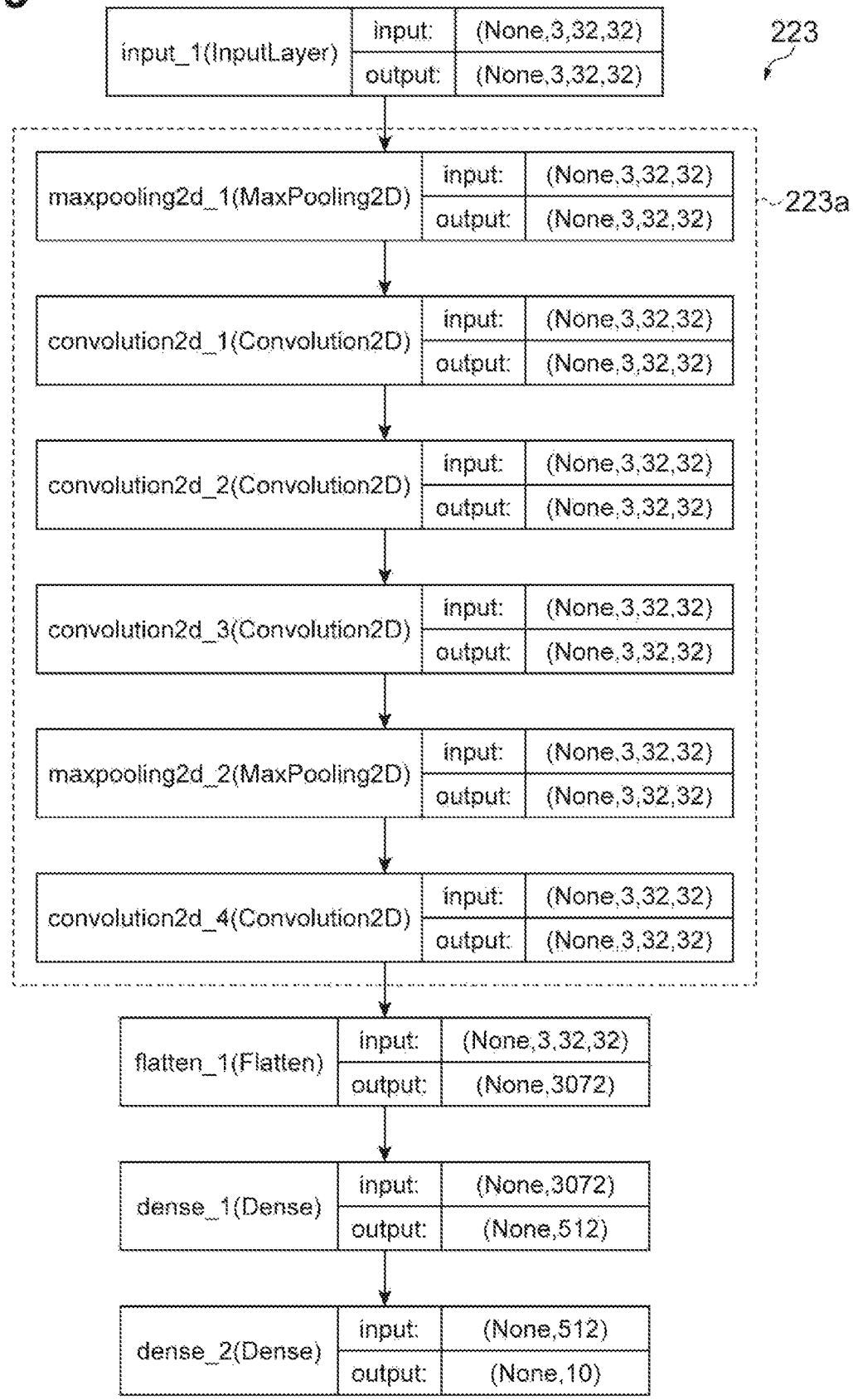
FIG. 5 is a view showing another example of a network structure of a deep learning model.

Because a partial layer is a network structure, it can be represented by a network diagram. FIGS. 3 to 5 are network diagrams showing examples of partial layers. In those figures, one non-terminal symbol is represented by one node, and the flow of processing is represented by an arrow. In this specification, each of non-terminal symbols that constitute a partial layer is referred to also as "layer". In FIG. 2, each layer is represented by a code in one row, and in FIGS. 3 to 5, each layer is represented by a node. In FIGS. 3 to 5, one arrow indicates that the output of a function (layer) at the start point is used as the input of a function (layer) at the end point. The templates of individuals 221 to 223 shown in FIGS. 3 to 5 are common. A partial layer 221a shown in FIG. 3 is a ResNet (Residual Network) type, a partial layer 222a shown in FIG. 4 is a branch type, and a partial layer 223a shown in FIG. 5 is a straight type. Those partial layers are also automatically generated by the information processing device 10. The partial layers 221a, 222a and 223a are contained in one common gene pool. Note that those partial layers 221a, 222a and 223a are different from the partial layers 211 to 213 shown in FIG. 2.

The information processing device 10 executes learning and evaluation processing for each of partial layers (for example, the partial layers 211 to 213 or the partial layers 221a, 222a and 223a) in a gene pool. For one certain partial layer, the information processing device 10 incorporates this partial layer into a template and thereby generates an individual. Next, the information processing device 10 inputs training data to the individual and causes the individual (deep learning model) to learn, and further inputs at least one of training data or test data to the individual and evaluates (verifies) the individual.

Then, the information processing device 10 generates a new partial layer from at least some of the plurality of partial layers that constitute the gene pool by using genetic programming. The genetic programming is a technique that prepares a plurality of individuals as candidates for a solution and searches for the solution (best individual) by repeating processing of executing genetic operation, such as crossover, mutation or selection, on at least some of the individuals. The information processing device 10 obtains a new partial layer (next-generation partial layer) by crossover or mutation of at least some partial layers (present-generation partial layers) in the gene pool. The present-generation partial layer corresponds to a parent, and the next-generation partial layer corresponds to a child.

After that, the information processing device 10 executes learning and evaluation (verification) in the same manner as above for each of the partial layers of those two generations. Specifically, the information processing device 10 incorporates a partial layer into a template and generates an individual, inputs training data to the individual and causes the individual to learn, and evaluates (verifies) the individual by using at least one of training data and test data. The information processing device 10 then determines a plurality of partial layers to remain in the gene pool and discards several partial layers. The processing of selecting partial layers to remain in a gene pool in this manner is equivalent to selection. In this embodiment, the information processing device 10 determines a plurality of partial layers to remain in a gene pool in such a way that the number of partial layers in the gene pool does not change before and after creating next-generation partial layers.

In one embodiment, the information processing device 10 repeats such a series of processing a plurality of times. This means creating a new partial layer by use of genetic programming and evaluating each individual, and searching for an individual with the highest evaluation value. In other words, the information processing device 10 searches for the best partial layer while deepening the gene pool. By not changing the number of partial layers in the gene pool in this repetitive processing, it is possible to maintain the diversity of partial layers and improve the evaluation of partial layers in the gene pool as a whole.

When specified conditions are met, the information processing device 10 ends the repetition and finally acquires one partial layer with the highest evaluation value. As a matter of course, the "partial layer with the highest evaluation value" is the partial layer that is incorporated into the individual with the highest evaluation value. The information processing device 10 incorporates the best partial layer into a template and generates an individual, and outputs this individual as the best deep learning model. By use of this generated deep learning model, it is expected to obtain an accurate solution to a complicated problem. One feature of the information processing device 10 is to obtain the best deep learning model by using genetic programming in this manner.

Figure 6:
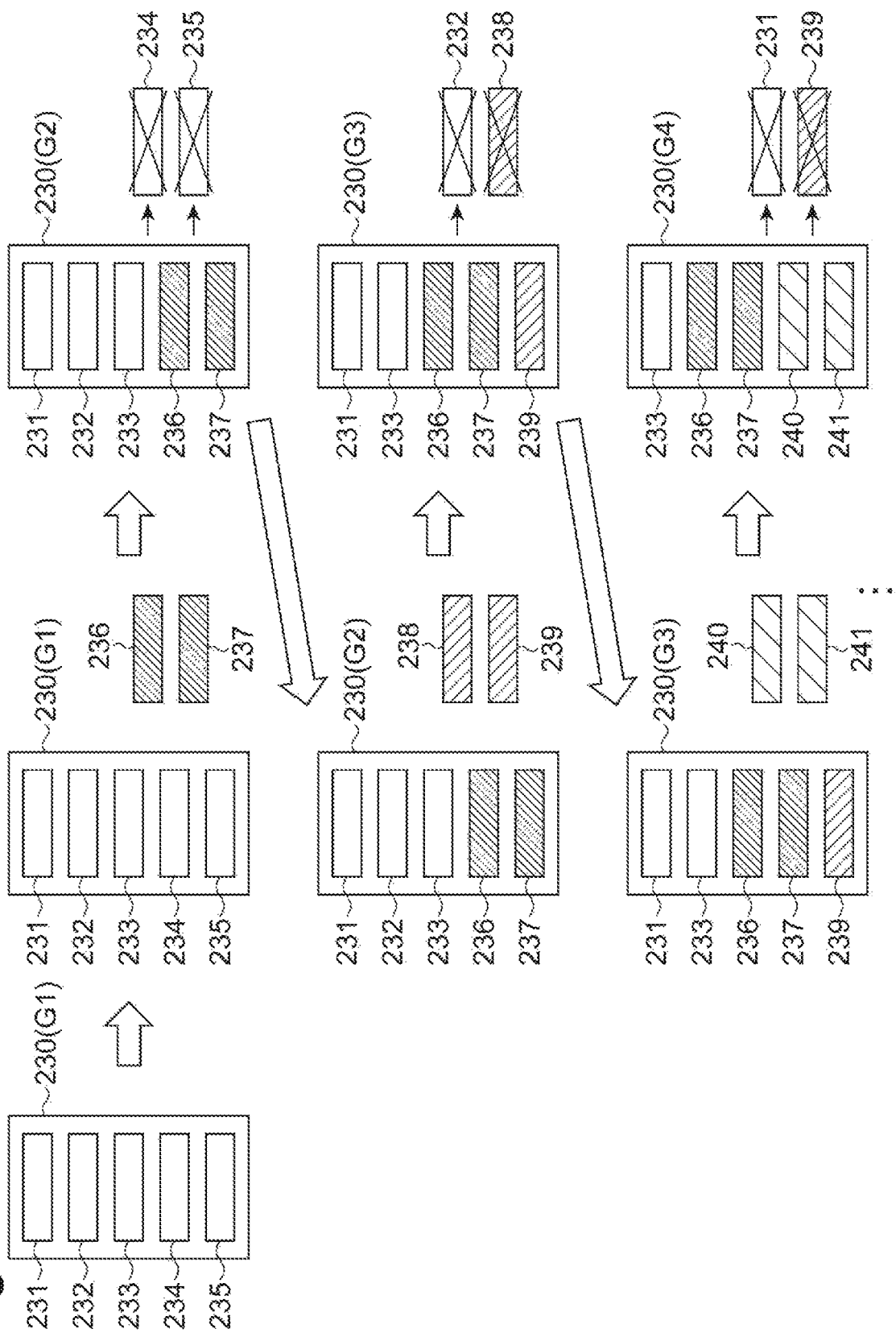
FIG. 6 is a view showing an example of the evolution of a gene pool by genetic programming.

FIG. 6 schematically shows an example of the evolution of a gene pool by genetic programming. For example, the information processing device 10 generates a gene pool 230 that contains five partial layers 231 to 235 in processing of the first loop. The gene pool 230 is the first generation (G1), and the partial layers 231 to 235 are present-generation partial layers.

Next, the information processing device 10 performs genetic operation (crossover or mutation) on at least some of the partial layers 231 to 235 and thereby generates partial layers 236 and 237 in the next generation. The information processing device 10 then selects five partial layers from the seven partial layers 231 to 237 according to a specified rule, and leaves the selected partial layers in the gene pool 230. The gene pool 230 generated by this selection is the second generation (G2), and it contains the partial layers 231 to 233, 236 and 237 in FIG. 6.

After that, the information processing device 10 performs genetic operation on at least some of the second-generation partial layers and thereby generates partial layers 238 and 239 in the next generation. The information processing device 10 then selects five partial layers from the seven partial layers 231 to 233 and 236 to 239 according to a specified rule, and leaves the selected partial layers in the gene pool 230. This gene pool 230 is the third generation (G3), and it contains the partial layers 231, 233, 236, 237 and 239 in FIG. 6.

In the next loop, the information processing device 10 generates partial layers 240 and 241 in the next generation from the third-generation partial layers, and finally generates the gene pool 230 in the fourth generation (G4) that contains the partial layers 233, 236, 237, 240 and 241. The information processing device 10 may further repeat such loop processing. After allowing the evolution of the gene pool in this manner, the information processing device 10 ends the loop processing at specified timing, and outputs, as the best deep learning model, an individual in which a partial layer with the highest evaluation value at that point is incorporated.

Configuration of Device

Figure 7:
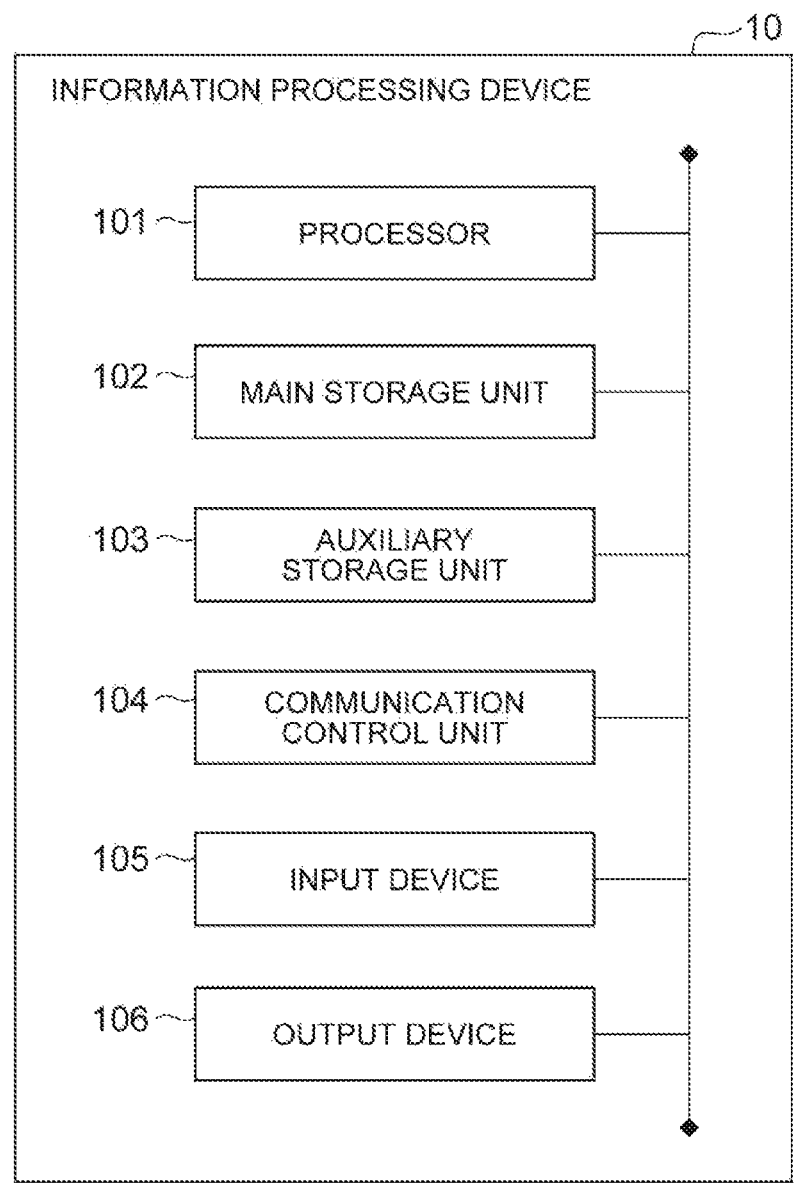
FIG. 7 is a view showing the hardware configuration of an information processing device according to an embodiment.

FIG. 7 shows a typical hardware configuration of the information processing device 10. The information processing device 10 includes a processor 101 that runs an operating system, an application program and the like, a main storage unit 102 such as ROM and RAM, an auxiliary storage unit 103 such as a hard disk or a flash memory, a communication control unit 104 such as a network card or a wireless communication module, an input device 105 such as a keyboard and a mouse, and an output device 106 such as a monitor. Examples of the processor 101 are CPU and GPU, and GPU, which is good at parallel computation, is generally used in deep learning that needs to execute a large amount of product-sum operation.

The functional elements of the information processing device 10 are implemented by loading given software (for example, an information processing program P1, which is described later) onto the processor 101 or the main storage unit 102 and running the program. The processor 101 makes the communication control unit 104, the input device 105 or the output device 106 operate in accordance with the software, and reads and writes data to and from the main storage unit 102 or the auxiliary storage unit 103. Data or databases required for the processing are stored in the main storage unit 102 or the auxiliary storage unit 103.

The information processing device 10 may be composed of a single computer or a plurality of computers. In the case of using a plurality of computers, those computers are connected through a communication network such as the Internet or an intranet, and thereby one information processing device 10 is logically constructed.

The information processing device 10 can access a database 20 through a communication network such as the Internet or an intranet. Although the database 20 is a different device from the information processing device 10 in this embodiment, a place where the database 20 is implemented is not particularly limited, and the database 20 may be included in the information processing device 10, for example.

The database 20 is a functional element or a device that stores a set of data so as to respond to a given data operation (e.g., extraction, addition, deletion, overwriting etc.) from a processor or an external computer. In this embodiment, the database 20 stores a data set to be used for learning and evaluation (verification) of a deep learning model. This data set is a set of combinations of input data and ground truth data that should be obtained from this input data. The data set includes training data for the information processing device 10 to learn a deep learning model and test data for verifying the accuracy of the deep learning model. The data set is prepared in accordance with a deep learning model to be obtained. For example, to obtain a deep learning model for recognizing an object from an image, the image data set called Cifar-10, which is often used as a benchmark of object recognition, may be used. The amount of data to be stored in the database 20 is generally enormous, but the number of pieces of data is not particularly limited. For example, the database 20 may store Cifar-10 that contains 50,000 pieces of training data and 10,000 pieces of test data.

Figure 8:
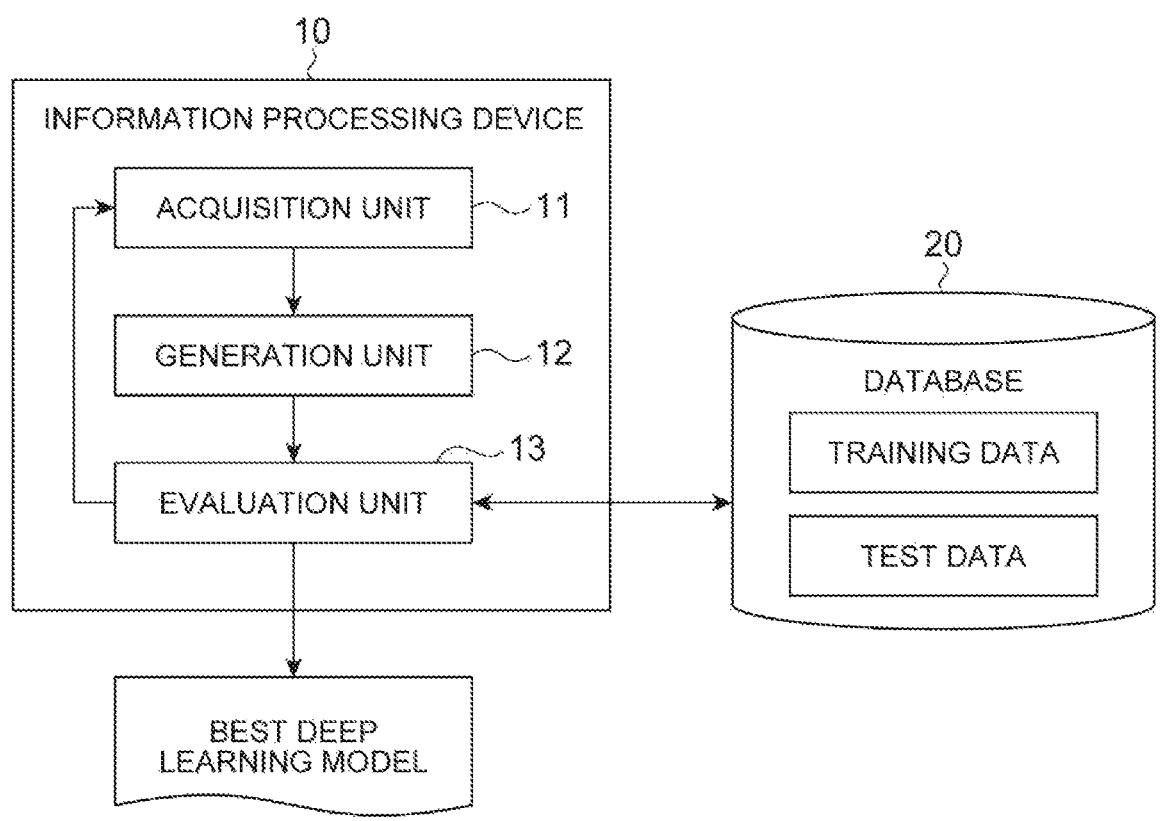
FIG. 8 is a view showing the functional configuration of the information processing device according to the embodiment.

FIG. 8 shows the functional configuration of the information processing device 10. The information processing device 10 includes an acquisition unit 11, a generation unit 12 and an evaluation unit 13 as functional elements.

The acquisition unit 11 is a functional element that acquires a plurality of partial layers as a gene pool. The acquisition unit 11 outputs the gene pool to the generation unit 12.

In processing of the first loop that acquires a gene pool for the first time, the acquisition unit 11 generates a plurality of partial layers and sets, as a gene pool, a set of partial layers. The acquisition unit 11 randomly selects one or more non-terminal symbols and randomly combines the non-terminal symbols and thereby generates one partial layer. The acquisition unit 11 may store non-terminal symbols necessary for generation of partial layers in advance, or may read the non-terminal symbols from a storage device such as a memory in the information processing device 10 or a predetermined external database (the database 20 etc.).

In this embodiment, the acquisition unit 11 makes sure to include, in a partial layer, convolution (Convolution2D function in an example of this embodiment) where the structural uniqueness of a deep learning model is likely to appear. Note that, however, this rule is not mandatory, and generation of a partial layer without inclusion of convolution may be allowed. Alternatively, the acquisition unit 11 may make sure to include, in a partial layer, both of convolution and pooling (MaxPooling2D function or AveragePooling2D function in an example of this embodiment). The initial size of each partial layer may be determined arbitrarily. For example, the acquisition unit 11 may set the number of layers (the number of nodes) to the range of 3 to 12 and determine the initial size from the distribution where the median of the number of nodes is maximum. The acquisition unit 11 generates a specified number of partial layers in a random manner as described above and thereby acquires a plurality of partial layers as a gene pool.

In processing of the second and subsequent loops, the acquisition unit 11 acquires, as a gene pool, a plurality of partial layers determined to remain in the gene pool by the evaluation unit 13. In this case, the gene pool is output from the evaluation unit 13 to the generation unit 12 in essence.

The generation unit 12 is a functional element that generates a new partial layer from a gene pool by using genetic programming. To be more specific, the generation unit 12 generates a new partial layer from at least some of a plurality of partial layers that constitute the gene pool.

First, the generation unit 12 incorporates a partial layer into a template of a deep learning model and thereby generates an individual (deep learning model). The acquisition unit 11 may store the template in advance, or may read the template from a storage device such as a memory in the information processing device 10 or a predetermined external database (the database 20 etc.). Next, the generation unit 12 reads training data from the database 20, inputs the training data to the generated individual and thereby causes the individual to learn. Further, the generation unit 12 reads at least one of training data and test data from the database and causes the individual to process the data to evaluate the individual. The generation unit 12 executes this series of processing on each of partial layers in a gene pool.

Then, the generation unit 12 selects the top specified number of partial layers with high evaluation values from a plurality of partial layers in the gene pool. The type of the evaluation value to be used as a reference for selection is not limited. For example, the generation unit 12 may determine the evaluation value based on an accuracy rate, and it may use the accuracy rate as the evaluation value, for example. Alternatively, the generation unit 12 may determine the evaluation value based on a loss (low level of performance of a deep learning model), and it may set a higher evaluation value as a loss is lower, for example. Alternatively, the generation unit 12 may set the evaluation value based on both of an accuracy rate and a loss. In this embodiment, it is assumed that a better individual has a higher evaluation value. "Having a high (or low) evaluation value" may be simply referred to as "having high (or low) evaluation".

After that, the generation unit 12 generates a new partial layer from a selected partial layer by using genetic programming. The generation unit 12 may generate two new partial layers by the crossover of two selected partial layers or may generate one new partial layer by the mutation of one selected partial layer. The number of new partial layers to be generated is not limited, and the number may depend on the probability of crossover and the probability of mutation which are set in advance, for example. To cause crossover and mutation to occur stochastically, the generation unit 12 may generate a random number and carry out crossover or mutation when the random number is included in a specified numerical range. After generating at least one new partial layer, the generation unit 12 adds the partial layer (next-generation partial layer) to the gene pool, and outputs the gene pool to the evaluation unit 13.

The framework of genetic programming is not limited. As one example, the generation unit 12 may use the framework called DEEP. Parameters related to genetic programming may include the number of generations, the number of individuals, the probability of crossover and the probability of mutation and, for example, the number of generations, the number of individuals, the probability of crossover and the probability of mutation may be set to 15, 20, 0.9 and 0.1, respectively.

When there are restrictions on the processing sequence among a plurality of layers (nodes) that constitute a partial layer, the generation unit 12 may generate a new partial layer by causing crossover and mutation to occur so as not to go against the restrictions. Note that an example of restrictions on the processing sequence is if-then-else, though restrictions are not limited thereto. By carrying out genetic operation so as not to go against the restrictions, it is possible to exclude in advance a partial layer that is expected to have low accuracy in operation due to going against the restrictions, which prevents unnecessary processing by the information processing device 10. Alternatively, the generation unit 12 may generate a new partial layer by causing crossover or mutation to occur without being obstructed by the restrictions. Because a partial layer that disregards the restrictions is likely to be not selected to remain, it is likely that such a partial layer is naturally discarded even without consideration of the restrictions.

The generation unit 12 may generate a new partial layer while dynamically changing the probability of mutation. For example, the generation unit 12 may generate a new partial layer by genetic operation after reducing the probability of mutation of a partial layer whose evaluation value is higher than a specified threshold to be lower than that of another partial layer. Alternatively, the generation unit 12 may generate a new partial layer by genetic operation after increasing the probability of mutation of a partial layer whose evaluation value is lower than a specified threshold to be higher than that of another partial layer. By increasing the probability of mutation of a partial layer whose evaluation value is relatively lower to be higher than that of another partial layer and thereby increasing the probability of mutation to a partial layer with a higher evaluation value, it is expected to further improve the performance of the best partial layer to be finally selected.

The evaluation unit 13 is a functional element that incorporates each of partial layers in a gene pool, to which a new partial layer is added, into a template, evaluates each partial layer, and thereby determines a plurality of partial layers to remain in the gene pool. The evaluation unit 13 generates an individual by incorporating a partial layer into a template, inputs at least one of training data and test data read from the database 20 to the individual and evaluates the individual. The evaluation unit 13 executes this series of processing on each of partial layers in a gene pool.

To reduce the processing time, the evaluation unit 13 may end the learning at the point where the superiority or inferiority of each partial layer is determined, and it may set the maximum evaluation value up to that point as the evaluation value of the partial layer.

To be specific, the evaluation unit 13 reads a set of training data which a processor (e.g., GPU) can process at a time as mini batch from the database 20, and executes the learning of an individual by using the mini batch. The evaluation unit 13 reads a new mini batch (a set of new training data) from the database 20 and makes the individual to learn. A unit corresponding to the number of times when all training data are used up after repeating learning with a mini batch is called "epoch". At the end of each epoch, the evaluation unit 13 evaluates the individual by using training data or test data.

Although the evaluation value of an individual generally becomes higher with an increase in epoch value, the evaluation value becomes lower than the previous value or becomes only slightly higher than the previous value at a certain point. In other words, for one certain individual (partial layer), the evaluation value in the i-th epoch becomes lower than the evaluation value in the (i−1)th epoch, or a difference between the evaluation value in the i-th epoch and the evaluation value in the (i−1)th epoch becomes very small. The evaluation unit 13 may end the learning and evaluation of the individual (partial layer) at this point. For example, when the evaluation value of a certain partial layer becomes lower than the previous evaluation value or when the degree of increase from the previous evaluation value falls below a specified threshold, the evaluation unit 13 may end the learning and evaluation of this partial layer. The "previous evaluation value" is the evaluation value in the previous epoch.

Figure 9:
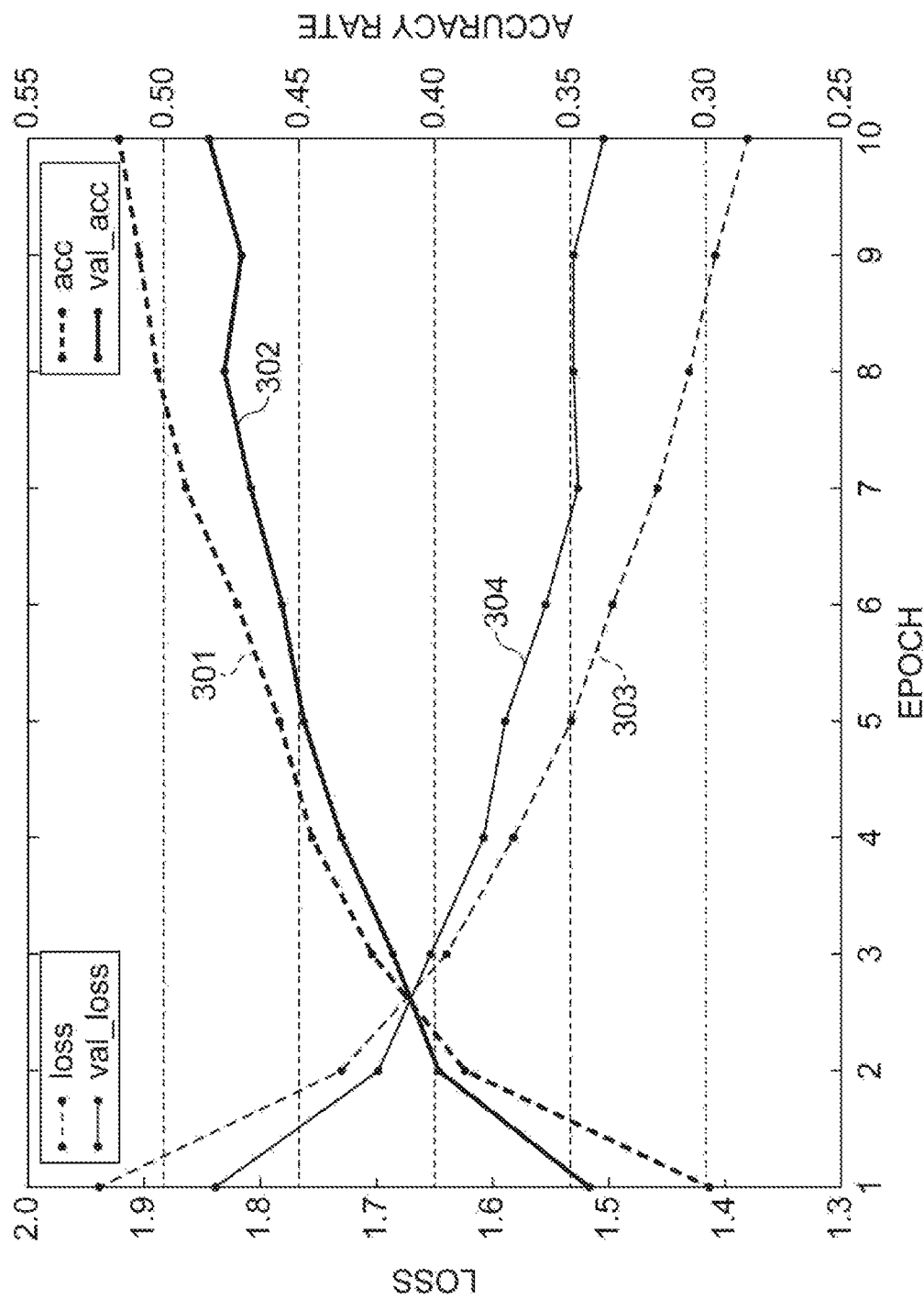
FIG. 9 is a graph showing an example of a learning curve of a deep learning model.

FIG. 9 shows an example of a learning curve (progression of evaluation values) obtained by repeating the learning and evaluation of one certain partial layer (one individual) for ten epochs. The horizontal axis of the graph indicates epoch, and the vertical axis indicates an accuracy rate or loss. The dashed line 301 indicates a learning accuracy rate (ace) obtained by operation reusing data used for learning, and the solid line 302 indicates a test accuracy rate (val_acc) obtained by operation using data not used for learning. The dashed line 303 indicates a learning loss (loss) obtained by operation reusing data used for learning, and the solid line 304 indicates a test loss (val_loss) obtained by operation using data not used for learning. Although the performance of the individual increases with repetition of learning as a matter of course, the performance converges at a certain point. In general, the evaluation value based on the learning accuracy rate or the learning loss is higher than the evaluation value based on the test accuracy rate or the test loss.

In the case of using the test accuracy rate (val_acc) indicated by the solid line 302 as the evaluation value, because this accuracy rate decreases in the 9th epoch, the evaluation unit 13 may terminate the processing at this point. In this case, the evaluation unit 13 may use the evaluation value in the 8th epoch as the evaluation value of the partial layer (individual). As another example, in the case of using the test loss (val_loss) indicated by the solid line 304, because the loss increases in the 8th epoch, the evaluation unit 13 may terminate the processing at this point. In this case, the evaluation unit 13 may use the evaluation value in the 7th epoch as the evaluation value of the partial layer (individual).

As described above, by evaluating an individual in each epoch and ending the learning and evaluation of the individual when the evaluation value decreases or the degree of increase in the evaluation value decreases, it is possible to reduce the processing load on the processor 101, the number of accesses to the database 20 and the like. It is thus possible to reduce the consumption of hardware resources or the traffic on a network.

In one embodiment, the information processing device 10 obtains the best partial layer by repeating a search including the generation of partial layers in the next generation and the evaluation of each partial layer a specified number of times (a plurality of times). From the viewpoint of genetic programming, the information processing device 10 allows the evolution of a gene pool while generating next-generation partial layers and thereby makes a search for the best partial layer. In one embodiment, the information processing device 10 may obtain the best partial layer without repeating this search.

The number of repetitions of the search by the generation unit 12 and the evaluation unit 13 may be determined arbitrarily. For example, the number of repetitions may be determined in advance.

Alternatively, the evaluation unit 13 may dynamically determine whether or not to carry out the search for the next loop. For example, the evaluation unit 13 may determine to carry out the next search only when the maximum evaluation value in a gene pool (a plurality of partial layers) is less than a specified threshold. Because further learning of each partial layer is done by increasing the number of repetitions of the search when the evaluation value of a deep learning model does not become higher (more specifically, when the evaluation value is lower than a specified threshold), it is expected to obtain a deep learning model that leads to good results.

When carrying out processing in the next loop, the evaluation unit 13 determines partial layers to remain in a gene pool in such a way that the number of partial layers in the gene pool is the same as the number before new partial layers are added. In other words, the evaluation unit 13 controls the gene pool in such a way that the number of partial layers in the gene pool remains the same. Then, the evaluation unit 13 outputs a plurality of selected partial layers (partial layers determined to remain) to the acquisition unit 11.

A method of selecting partial layers to remain in a gene pool is not particularly limited. For example, the evaluation unit 13 may select the top specified number of partial layers with high evaluation values among a plurality of partial layers in a gene pool, or may discard the bottom specified number of partial layers with low evaluation values. Alternatively, the evaluation unit 13 may randomly select partial layers in the first to i-th (1<i<n) loop processing, and select the top specified number of partial layers or discard the bottom specified number of partial layers based on the evaluation values as described above in the (i+1)th and subsequent loop processing. By randomly selecting partial layers at the early stage of repetitive processing, it is possible to ensure the diversity of partial layers.

In the final loop processing (i.e., when not carrying out the next loop processing), the evaluation unit 13 selects a partial layer with the highest evaluation value in the gene pool and incorporates this partial layer into a template, and thereby generates an individual. Then, the evaluation unit 13 outputs this individual as the best deep learning model. The output destination of the deep learning model is not limited. For example, the evaluation unit 13 may store the best deep learning model into a storage device such as the database 20 or transmit the deep learning model to another computer. Alternatively, the evaluation unit 13 may render the deep learning model on a monitor to visualize the model.

Operation of Device

Figure 10:
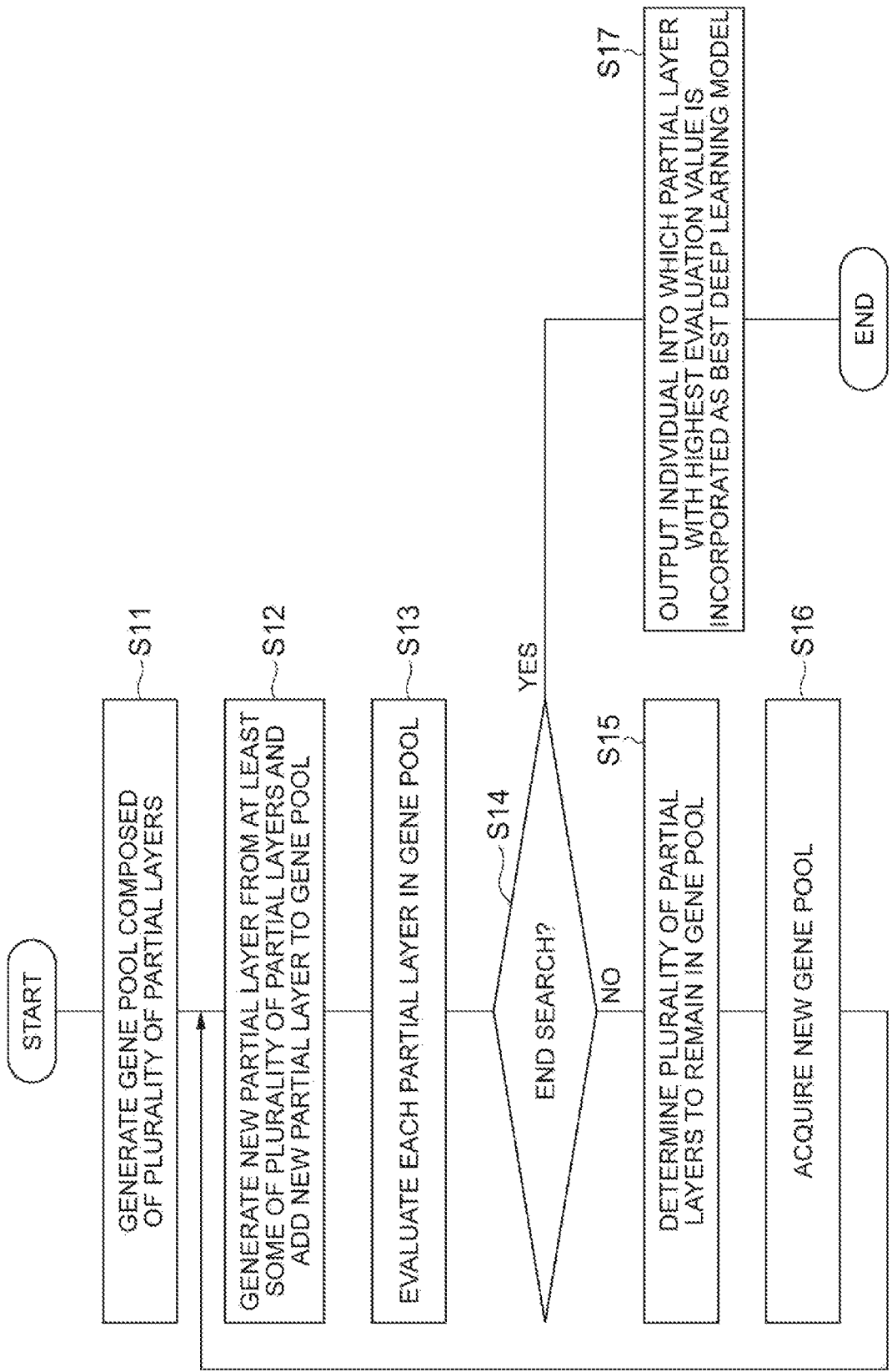
FIG. 10 is a flowchart showing the operation of the information processing device according to the embodiment.

The operation of the information processing device 10 and an information processing method according to this embodiment are described hereinafter with reference to FIG. 10. FIG. 10 is a flowchart showing the operation of the information processing device 10.

First, the acquisition unit 11 newly generates a plurality of partial layers, and generates a gene pool composed of those partial layers (Step S11, acquisition step). This corresponds to the acquisition of a gene pool in the first loop processing. Next, the generation unit 12 generates a new partial layer from at least some of the plurality of partial layers by using genetic programming, and adds the new partial layer to the gene pool (S12, generation step). Then, the evaluation unit 13 evaluates each of the partial layers in the gene pool (Step S13, evaluation step). As described above, the evaluation unit 13 may evaluate each partial layer based on at least one of an accuracy rate and a loss. Further, the evaluation unit 13 determines whether or not to end a search (Step S14).

When it is determined to continue a search (No in Step S14), the evaluation unit 13 determines a plurality of partial layers to remain in the gene pool (Step S15, evaluation step). As described above, the evaluation unit 13 may select the partial layers in a random manner or may select them based on the evaluation values. Consequently, the plurality of partial layers are obtained as a new gene pool (Step S16, acquisition step), and then the processing of Steps S12 to S14 is repeated after that.

On the other hand, when it is determined to end a search (Yes in Step S14), the evaluation unit 13 generates an individual into which a partial layer with the highest evaluation value is incorporated, and outputs this individual as the best deep learning model (Step S17, output step). As a result, the deep learning model that is expected to be most appropriate (to obtain a solution with the highest accuracy) is obtained.

Program

Figure 11:
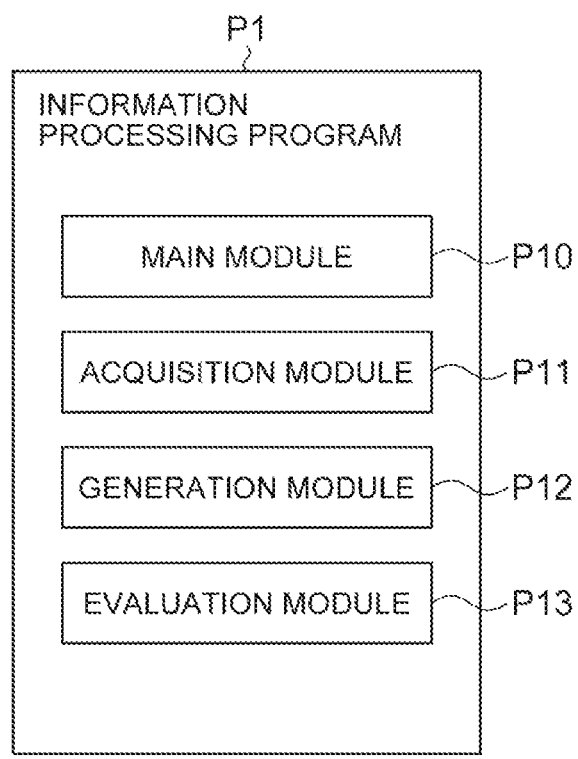
FIG. 11 is a view showing the configuration of an information processing program according to the embodiment.

An information processing program P1 that causes a computer to function as the information processing device 10 is described hereinafter with reference to FIG. 11. FIG. 11 is a view showing the configuration of the information processing program P1.

The information processing program P1 includes a main module P10, an acquisition module P11, a generation module P12, and an evaluation module P13. The main module P10 is a part that exercises control over the generation of a deep learning model. The acquisition unit 11, the generation unit 12 and the evaluation unit 13 are implemented by executing the acquisition module P11, the generation module P12 and the evaluation module P13, respectively.

The information processing program P1 may be provided in the form of being recorded in a static manner on a tangible recording medium such as CD-ROM, DVD-ROM or semiconductor memory, for example. Alternatively, the information processing program P1 may be provided as a data signal superimposed onto a carrier wave through a communication network.

Advantageous Effects

As described above, an information processing device according to one aspect of the present invention is an information processing device including a processor, and the processor executes an acquisition step of acquiring a plurality of partial layers as a gene pool, the partial layers being candidates for elements of a deep learning model, a generation step of generating a new partial layer from the gene pool by using genetic programming, an evaluation step of evaluating each partial layer by incorporating, into a template of the deep learning model, each partial layer in the gene pool to which the new partial layer is added, and determining a plurality of partial layers to remain in the gene pool, and an output step of outputting the deep learning model into which the partial layer with a highest evaluation value is incorporated.

An information processing method according to one aspect of the present invention is an information processing method performed by an information processing device including a processor, the method including an acquisition step of acquiring a plurality of partial layers as a gene pool, the partial layers being candidates for elements of a deep learning model, a generation step of generating a new partial layer from the gene pool by using genetic programming, an evaluation step of evaluating each partial layer by incorporating, into a template of the deep learning model, each partial layer in the gene pool to which the new partial layer is added, and determining a plurality of partial layers to remain in the gene pool, and an output step of outputting the deep learning model into which the partial layer with a highest evaluation value is incorporated.

An information processing program according to one aspect of the present invention causes a computer to execute an acquisition step of acquiring a plurality of partial layers as a gene pool, the partial layers being candidates for elements of a deep learning model, a generation step of generating a new partial layer from the gene pool by using genetic programming, an evaluation step of evaluating each partial layer by incorporating, into a template of the deep learning model, each partial layer in the gene pool to which the new partial layer is added, and determining a plurality of partial layers to remain in the gene pool, and an output step of outputting the deep learning model into which the partial layer with a highest evaluation value is incorporated.

In the above aspects, a gene pool is prepared that contains a plurality of partial layers (present-generation partial layers), which are candidates for elements of a deep learning model, and a new partial layer (next-generation partial layer) generated using genetic programming. Then, the gene pool is updated by evaluating each of the partial layers in those generations and determining partial layers to remain in the gene pool. By performing such a series of processing (search) using genetic programming, it is expected to obtain a partial layer that leads to good computational results. This partial layer is incorporated into a deep learning model, and it is thereby possible to construct the deep learning model that is expected to be most appropriate.

Further, in the above aspects, a focus is placed not on the entire deep learning model but on partial layers, which are the essential parts of the deep learning model, and the partial layers are made to evolve by using genetic programming. This reduces the computational time and also suppresses the consumption of a processor and a memory compared with the case of automatically constructing the entire deep learning model. Thus, the above-described aspects of the present invention have the technical effect that constructs an appropriate deep learning model while suppressing the consumption of hardware resources of a computer rather than merely constructing a deep learning model automatically.

Further, in the above aspects, each partial layer evolves by processing training data, and therefore the best deep learning model that is obtained finally is compatible with data to be processed. Thus, it is possible to automatically generate the deep learning model that is most appropriate for the area of a problem to be solved without any manual intervention.

In the information processing device according to another aspect, the processor may execute the output step after repeating the generation step and the evaluation step. By repeating a series of processing (search) using a genetic algorithm, it is expected to obtain a partial layer that leads to good computational results. This partial layer is incorporated into a deep learning model, and it is thereby possible to construct the deep learning model that is expected to be most appropriate.

In the information processing device according to another aspect, the processor may repeat the search n number of times, where n is a natural number greater than 1, the processor may randomly determine the plurality of partial layers to remain in the gene pool in the evaluation step up to i-th time, and the processor may determine the plurality of partial layers to remain in the gene pool based on evaluation values in the evaluation step in (i+1)th and subsequent times, where i is a natural number smaller than n. By randomly selecting partial layers at the early stage of repetitive processing, it is possible to ensure the diversity of partial layers. Further, by selecting partial layers based on evaluation values at the later stage of repetitive processing, it is possible to finally obtain a deep learning model with high evaluation.

In the information processing device according to another aspect, each partial layer may include convolution. By making sure to include, in a partial layer, convolution where the structural uniqueness of a deep learning model is likely to appear, it is possible to further increase the probability of obtaining a partial layer that leads to good computational results.

In the information processing device according to another aspect, the evaluation of each partial layer may include evaluating the deep learning model into which the partial layer is incorporated for each epoch, and ending learning of the deep learning model when an evaluation value becomes lower than in a previous epoch. By terminating the learning at the point where the superiority or inferiority of each partial layer is determined, the time to evaluate each partial layer is reduced, and it is thereby possible to further reduce the processing load on the processor and the consumption of a memory.

In the information processing device according to another aspect, in the evaluation step, the processor may determine the plurality of partial layers to remain in the gene pool in such a way that the number of partial layers in the gene pool does not change. By not changing the number of partial layers in the gene pool in the repetitive processing, it is possible improve the evaluation of partial layers in the gene pool as a whole while maintaining the diversity of partial layers.

In the information processing device according to another aspect, the genetic programming may generate a new partial layer by increasing the probability of mutation applied to the partial layer as an evaluation value of the partial layer is lower. By setting the probability of mutation in this manner, the probability increases that a partial layer with low evaluation changes into the one with high evaluation, and it is expected to obtain a partial layer (deep learning model) that leads to good computational results. In addition, it is possible to obtain an appropriate deep learning model in a short time.

In the information processing device according to another aspect, when an evaluation value of the deep learning model does not become higher, the processor may increase the number of repetitions of a search including the generation step and the evaluation step. Increasing the number of searches allows further learning of each partial layer, and it is expected to obtain a deep learning model that leads to good computational results Modified Example An embodiment of the present invention is described in detail above. However, the present invention is not limited to the above-described embodiment. Various changes and modifications may be made to the present invention without departing from the scope of the invention.

When the highest evaluation value in a gene pool (a plurality of partial layers) becomes lower than the previous highest evaluation value or when the degree of increase from the previous highest evaluation value falls below a specified threshold, the evaluation unit 13 may increase the number of partial layers in the gene pool, increase the probability of crossover, or increase the probability of mutation. The "previous highest evaluation value" is the highest evaluation value in the gene pool in the previous loop processing. By increasing the number of individuals or increasing the probability of genetic operation when the evaluation value of a deep learning model does not become higher, it is expected to obtain a partial layer (deep learning model) that leads to good results. In addition, it is possible to obtain an appropriate deep learning model in a short time.

In this manner, in the information processing device according to another aspect, when the evaluation value of a deep learning model does not become higher, a processor may increase the number of individuals, increase the probability of crossover in genetic programming, or increase the probability of mutation in genetic programming.

The procedure of the information processing method that is performed by at least one processor is not limited to the example shown in the above embodiment. For example, some of the above-described steps (processing) may be skipped, or the steps may be performed in a different order. For example, the information processing device may perform an information processing method including only Steps S11, S12, S13 and S17 described above (in other words, the repetition of a search is not necessary). Further, any two or more steps of the above-described steps may be combined, or some of the steps may be modified or eliminated. Alternatively, another step may be performed in addition to the above-described steps.

When comparing two numerical values in the information processing device, any of the two criteria "equal to or more than" and "more than" may be used, and any of the two criteria "equal to or less than" and "less than" may be used. Selection of the criteria would not change the technical significance regarding the processing of comparing two numerical values.

REFERENCE SIGNS LIST

10 . . . information processing device, 20 . . . database, 11 . . . acquisition unit, 12 . . . generation unit, 13 . . . evaluation unit, P1 . . . information processing program, P10 . . . main module, P11 . . . acquisition module, P12 . . . generation module, P13 . . . evaluation module

The invention claimed is:

1. An information processing device comprising:
at least one memory operable to store program code; and
at least one processor operable to read the program code and operate as instructed by the program code, the program code being configured to cause the at least one processor to:
acquire a plurality of partial layers as a gene pool, the partial layers being candidates for elements of a deep learning model;
generate a new partial layer from the gene pool by using genetic programming;
evaluate each partial layer by incorporating, into a template of the deep learning model, each partial layer in the gene pool to which the new partial layer is added, and determine a plurality of partial layers to remain in the gene pool; and
output the deep learning model into which the partial layer with a highest evaluation value is incorporated.

2. The information processing device according to claim 1, wherein
the program code is further configured to cause the at least one processor to output the deep learning model after repeating a search including the generation and the evaluation.

3. The information processing device according to claim 2, wherein
the program code is further configured to cause the at least one processor to repeat the search n number of times, where n is a natural number greater than 1, and
the program code is further configured to cause the at least one processor to determine the plurality of partial layers to remain in the gene pool in the evaluation up to i-th time, and determine the plurality of partial layers to remain in the gene pool based on evaluation values in the evaluation in (i+1)th and subsequent times, where i is a natural number smaller than n.

4. The information processing device according to claim 1, wherein
each partial layer includes convolution.

5. The information processing device according to claim 1, wherein
the evaluation of each partial layer includes evaluating the deep learning model into which the partial layer is incorporated for each epoch of a series of epochs, and ending learning of the deep learning model when an evaluation value becomes lower than in a previous epoch in the series of epochs.

6. The information processing device according to claim 1, wherein
in the evaluation, the program code is further configured to cause the at least one processor to determine the plurality of partial layers to remain in the gene pool in such a way that the number of partial layers in the gene pool does not change.

7. The information processing device according to claim 1, wherein
the genetic programming generates a new partial layer by increasing the probability of mutation applied to a partial layer having an evaluation value lower than a specified threshold.

8. The information processing device according to claim 1, wherein
when an evaluation value of the deep learning model does not become higher, the program code is further configured to cause the at least one processor to increase a number of repetitions of a search including the generation and the evaluation, increase a number of partial layers in the gene pool, increase a probability of crossover in the genetic programming, or increase a probability of mutation in the genetic programming.

9. An information processing method performed by an information processing device including a processor, the method comprising:
acquiring a plurality of partial layers as a gene pool, the partial layers being candidates for elements of a deep learning model;
generating a new partial layer from the gene pool by using genetic programming;
evaluating each partial layer by incorporating, into a template of the deep learning model, each partial layer in the gene pool to which the new partial layer is added, and determining a plurality of partial layers to remain in the gene pool; and
outputting the deep learning model into which the partial layer with a highest evaluation value is incorporated.

10. A non-transitory recording medium storing an information processing program causing a computer to:
acquire a plurality of partial layers as a gene pool, the partial layers being candidates for elements of a deep learning model;
generate a new partial layer from the gene pool by using genetic programming;

evaluate each partial layer by incorporating, into a template of the deep learning model, each partial layer in the gene pool to which the new partial layer is added, and determine a plurality of partial layers to remain in the gene pool; and output the deep learning model into which the partial layer with a highest evaluation value is incorporated.

\* \* \* \* \*